United States Patent [19]

Tateishi

[11] Patent Number: 5,420,839
[45] Date of Patent: May 30, 1995

[54] METHOD OF REPRODUCING HIGH-SPEED AUDIO DATA BY A CD-ROM PLAYER

[75] Inventor: Kiyoshi Tateishi, Saitama, Japan

[73] Assignee: Pioneer Electronic Corporation, Tokyo, Japan

[21] Appl. No.: 337,416

[22] Filed: Nov. 7, 1994

Related U.S. Application Data

[63] Continuation of Ser. No. 81,094, Jun. 25, 1993, abandoned.

[30] Foreign Application Priority Data

Jun. 30, 1992 [JP] Japan .................. 4-172758

[51] Int. Cl.⁶ .............................................. G11B 7/00
[52] U.S. Cl. ...................................... 369/32; 369/47; 369/59
[58] Field of Search ............... 369/32, 33, 18, 47, 369/48, 54, 59; 360/32, 24, 27

[56] References Cited

U.S. PATENT DOCUMENTS

| | | | |
|---|---|---|---|
| 5,105,402 | 4/1992 | Ishii et al. | 369/32 |
| 5,218,450 | 6/1993 | Nagai et al. | 369/32 |
| 5,220,545 | 6/1993 | Tomimitsu | 369/32 |
| 5,220,551 | 6/1993 | Tataishi et al. | 369/32 |
| 5,222,054 | 6/1993 | Muraoka et al. | 369/32 |
| 5,224,081 | 6/1993 | Muraoka et al. | 369/32 |

Primary Examiner—Georgia Y. Epps
Assistant Examiner—Tan Dinh
Attorney, Agent, or Firm—Sughrue, Mion, Zinn, Macpeak & Seas

[57] ABSTRACT

A method of performing a reproduction of a high-speed audio data in a CD-ROM player comprises the steps of; reading EFM demodulated data from the disk at a high speed, writing the thus read data one after the other into a CD-ROM data storage as an input buffer of an audio signal processing section, reading out the written data at the same frequency as the sampling frequency thereof, transmitting the data read out from the CD-ROM data storage sequentially to the audio signal processing section, stopping the EFM demodulated data writing operation to the CD-ROM data storage when the address for writing the data is on the verge of exceeding the address which is not read out yet, simultaneously jumping the optical disk back for a certain pitch corresponding to a predetermined number of tracks to read in again, and resuming the data writing operation from the point where the data writing was previously stopped when a predetermined number of vacant addresses is made in the CD-ROM data storage by the above data reading operation which has been advanced during the period the data writing operation was stopped.

6 Claims, 4 Drawing Sheets

METHOD OF REPRODUCING HIGH-SPEED AUDIO DATA BY A CD-ROM PLAYER

This is a Continuation of application Ser. No. 08/081,094, filed Jun. 25, 1993, and now abandoned.

BACKGROUND OF THE INVENTION

1. Field of the Invention

The present invention relates to a method of reproducing high-speed audio data by a CD-ROM player which is capable of reproducing both audio and digital data.

2. Description of the Prior Art

Hitherto, there has been proposed a CD-ROM and a CD-I (CD-Interactive) as an optical disk capable of recording both digital data such as the data operable in computers, and video data as well as audio data such as music, voice sound and so on. The CD-ROM is a disk standardized for recording above explained digital data as well as audio data in the audio signal area, yet having compatibility with a CD (compact disk) which basically deals with acoustic signals only, whereas the CD-I is an interactive disk defined in the Mode-2 of the above-mentioned CD-ROM, and is a standardized system in which the above-disclosed computer data, video data, audio data and so on are recorded per blocks by a time division multiplex mode.

FIG. 4 is a signal processing circuit in a conventional CD-ROM player. In the figure, reference numeral 1 denotes an audio signal processing section, 2 denotes a memory for storing audio signals, 3 an audio interface, 4 a digital to analog converter (hereinafter referred to just as "D/A converter"), 5 a low pass filter, 6 a CD-ROM data processing section, 7 a CD-ROM data storage which is also used as an interface buffer memory, and reference numeral 8 denotes a host computer interface such as a small computer system interface (hereinafter referred to simply as "SCSI").

In reference to FIG. 4 the signal which had previously been modulated by the EFM (Eight-to-Fourteen Modulation) method and read in from a disk is first demodulated at an EFM demodulation circuit (not shown), and then sent to the signal processing circuit shown in FIG. 4. The input EFM demodulated data is first stored in the memory 2, and then an error check to the audio signal is performed by a CIRC (Cross Interleave Reed-Solomon Code) error checking method to correct defected audio signal if any in the audio signal processing section 1. Thereafter, if the signal read in from the disk is an audio signal, the data corrected by the CIRC error checking method is fed to the D/A converter 4 by way of the audio interface 3, and after the digital to audio conversion thereof is through, it is further fed to the low pass filter 5 where high frequency components are deleted, so that a reproduced audio signal in the form of an analog signal is finally output.

On the other hand, if the signal read in from the disk is a digital signal, the data corrected by the CIRC error checking method is fed to the CD-ROM data storage 7 by way of the CD-ROM data processing section 6, wherein an error check to the stored CD-ROM data is performed with the error correction parity codes P and Q, and after the data is corrected thereby, the digital data is fed to the interface 8, which is further sent to a host computer.

By the way, it has been a common procedure nowadays to read in the digital data at a twice or a four-time faster speed than the normal speed in order to meet with the recent increase in requirement for high-speed data processing. However, since it is necessary to reproduce the audio signal as a correct sound in case that digital data and audio data are taken in by turns from one disk, in a conventional CD-ROM player as the one shown in FIG. 4, the audio signal has to be read in at the same speed as the sampling frequency thereof. Due to this, it has been a problem to require a certain time to switch the rotation speed of the disk any time when the signal to be received from the disk is changed from audio to digital and vice versa, and therefore there has not been much merit in processing digital data at a high speed.

A simple solution to this problem has been to read in the audio signal at the same speed as that for reading the digital data, but has not been effective since the conventional CD-ROM player can not make a faithful reproduction of the audio signal at a high speed due to a change in the reproducing speed.

SUMMARY OF THE INVENTION

The present invention has been made to eliminate such problems as described above, and it is an object of the present invention to provide a method of reproducing audio data in a CD-ROM player, wherein even in a case that digital data and audio data are read out by turns from one disk, it is not necessary to slow down the rotation speed of the disk for reproducing the audio signal.

In order to achieve the above object, a method of performing a reproduction of high-speed audio data in a CD-ROM player according to the present invention comprises the steps of; reading EFM demodulated data from the disk at a high speed, writing the thus read data one after the other into a CD-ROM data storage as an input buffer of an audio signal processing section, reading out the written data at the same frequency as the sampling frequency thereof, transmitting the data read out from the CD-ROM data storage sequentially to the audio signal processing section, stopping the EFM demodulated data writing operation to the CD-ROM data storage when the address for writing the data is on the verge of exceeding the address which is not read out yet, simultaneously jumping the optical disk back for a certain pitch corresponding to a predetermined number of tracks to read in again, and resuming the data writing operation from the point where the data writing was previously stopped when a predetermined number of vacant addresses is made in the CD-ROM data storage by the above data reading operation which has been advanced during the period the data writing operation was stopped.

As shown in FIG. 4, there is provided, for example, a 4K-byte small capacity RAM as an audio signal storage 2 which is enough for error correction. On the other hand, a CD-ROM data storage 7 is provided, for example, with 128K-byte large capacity RAM since it also functions as a buffer memory for data transmission to a host computer (not shown). Further, the CD-ROM data storage 7 in a conventional CD-ROM player is used only for reproducing digital data such as computer data, video data and so on, and is not used for reproducing audio data such as music, vocal sound and so forth.

The present invention has been made paying attention to this fact, wherein a CD-ROM data storage 7 which was not conventionally used except for reproduction of digital data is used for reproduction of audio data as an input buffer memory of the audio signal processing section 1.

In other words, according to the present invention, the EFM demodulated data read in at a high speed is once written into the CD-ROM data storage 7 instead of directly being fed to the audio signal processing section 1, and thereafter, the thus written EFM demodulated data is read out one by one from the CD-ROM data storage 7 at the normal speed which is the same speed as the sampling frequency of the audio signal so as to be transmitted to the audio signal processing section.

By this method above, audio and video signals can both be taken in at twice or faster than the normal speed, so that even in a case for reading in audio and digital data by turns from a disk, it is no longer necessary to slow down the rotation speed when reading in audio data to the original speed.

On the other hand, when the demodulated data read in at twice or four times faster than the normal speed is written into the CD-ROM data storage 7, considering the fact that the speed for reading out the audio signal therefrom is the normal speed which is same as the sampling frequency thereof, there will be a moment at which the speed of the writing operation exceeds that of the reading operation, so that the EFM data which has been stored in the CD-ROM data storage but has not been read out yet to be reproduced can be destroyed.

In order to avoid this phenomenon, in the present invention, when all the addresses in the CD-ROM data storage are filled with the EFM data, and the writing operation turns round to reach the address which has not been read out yet, the data writing operation is stopped, although during which time the reading operation is still continued, and simultaneously the optical pick up device is jumped back for a predetermined number of tracks to read in the data from the disk again, and thereafter, when a predetermined number of addresses available to write in is made in the CD-ROM data storage by the still continued data reading operation, the writing operation of the demodulated data is resumed from the address at which it had previously been stopped.

With the control operation above, the demodulated data read in at a high speed from the disk is written into the CD-ROM data storage one by one without destroying the EFM demodulated data which has not been read out therefrom yet. It is to be noted that for a smooth operation of the above controlling process, it will be preferable to perform the writing operation of the EFM demodulated data to the CD-ROM data storage and the stopping operation thereof per block (or sub code) of the CD format.

Other objects and features of the invention will be more fully understood from the following detailed description and appended claims when taken in conjunction with the accompanying drawings.

DETAILED DESCRIPTION OF THE PREFERRED EMBODIMENTS

Figure 1:
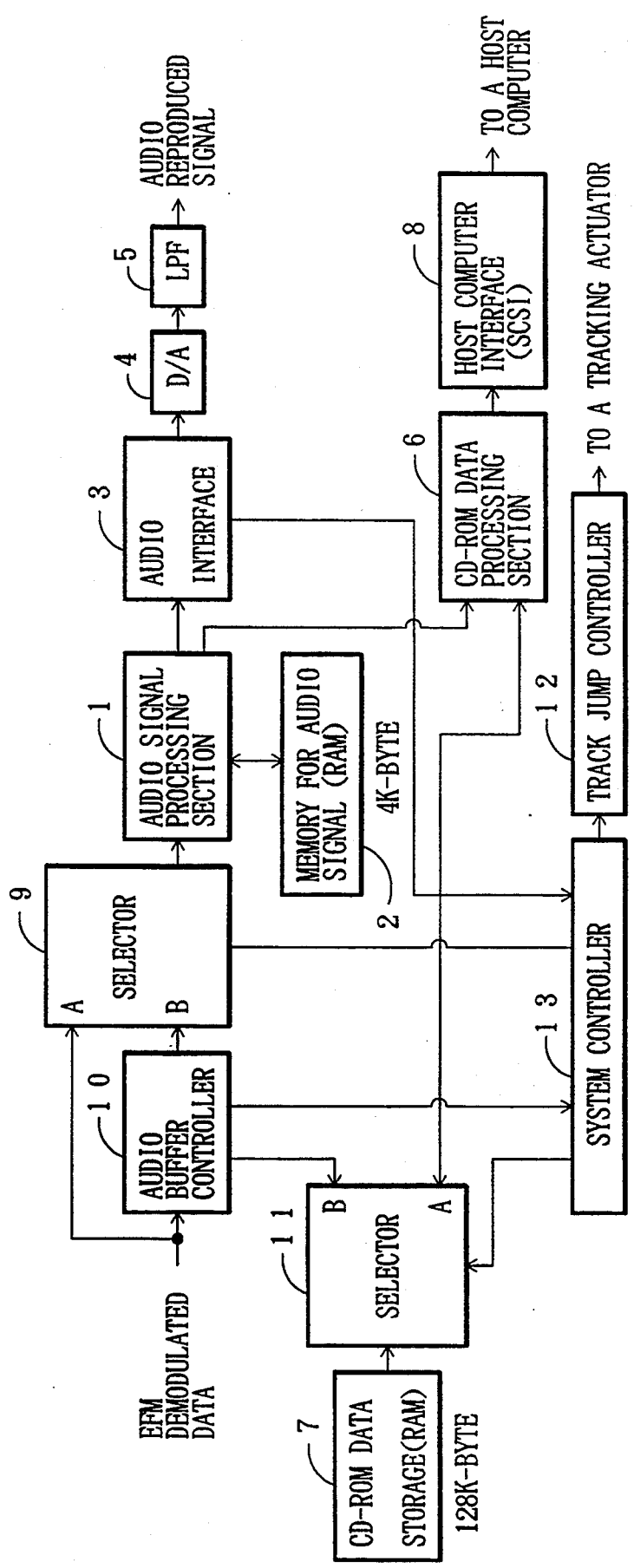
FIG. 1 is block diagram showing a CD-ROM player adopting the method of the present invention.
Figure 4:
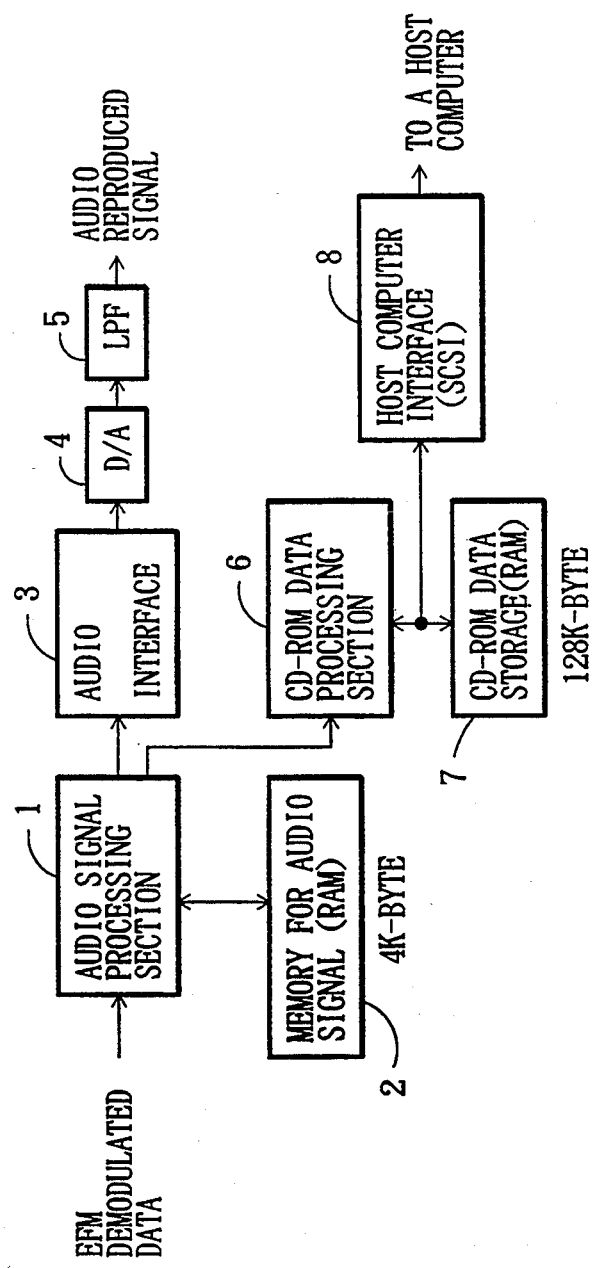
FIG. 4 is a block diagram showing a conventional CD-ROM player.

In the following, several embodiments of the present invention are described with reference to the accompanying drawings, wherein FIG. 1 is a block diagram showing one embodiment of the CD-ROM player adopting the method of the present invention. It is to be noted that like reference numerals in FIG. 4 denote like or corresponding portions in FIG. 1.

Referring to FIG. 1, reference numeral 1 denotes an audio signal processing section, 2 denotes a memory for audio signals, 3 an audio interface, 4 a D/A converter, 5 low pass filter, 6 a CD-ROM data processing section, 7 a CD-ROM data storage which is also used as an interface buffer memory, and 8 denotes a host computer interface such as SCSI.

The audio signal processing section 1 is connected at the input terminal thereof to an audio buffer controller 10 through a selector 9, wherein the audio buffer controller is selectively connected thereto by the selector 9 when the audio data is read in at a high speed.

On the other hand, the CD-ROM data storage 7 is connected to the audio buffer controller 10 and to the CD-ROM data processing section 6 by way of a selector 11. In the present invention, this CD-ROM data storage 7 can be used, apart from its original function as the storage for CD-ROM data, also as an input buffer memory of the audio signal processing section 1 by selectively connecting it to the audio buffer controller 10 through the selector 11 when the audio data is read in at a high speed.

Reference numeral 12 denotes a track jump control circuit for jumping back the optical pick up device for a predetermined number of tracks of the disk when the EFM demodulated data writing operation is stopped when the audio data is read in at a high speed, and numeral 13 denotes a system controller for controlling the operation of the device as a whole.

Referring to FIG. 1, the operation of the device in case audio data such as music, vocal sound and so on is read in at a high-speed is now explained as below. It should be noted that the disk here is rotated four times faster than the normal speed by a spindle motor and a speed servo circuit (not shown). Further, the selectors 9 and 11 respectively select the B terminal sides in accordance with a command from the system controller 13, so that the CD-ROM data storage 7 can be connected to the input terminal of the audio signal processing section 1 to be used as an input buffer memory thereof.

In the above situation, when the demodulated data read in at the above four-time faster speed is input, it is sent to the CD-ROM data storage 7 by way of the audio buffer controller 10 and the selector 11 so as to be stored therein one after the other. At this stage, while the data is being written into the CD-ROM data storage 7, the thus written data is simultaneously read out sequentially at the frequency equal to the sampling frequency of the audio signal, and thereafter each of these data is transmitted to the audio signal processing section 1 by way of the selector 11, audio data buffer controller 10, and the selector 9.

The demodulated data thus transmitted to the audio signal processing section 1 is, after once stored in the audio signal data memory (RAM) 2 as conventionally done, checked by the CIRC checking method. Thereafter, the error-checked data is sent to the audio interface 3 and further to the D/A converter, and after the digital to analog conversion of the data in the D/A converter is completed, it is further fed to the low pass filter 5 where the high-frequency component is taken away, so that the processed data is finally output as a reproduced audio signal formed in analog signal.

In the above process, the writing operation to the CD-ROM data storage 7 is performed at the quadrupled speed, and the data reading operation therefrom is performed at the frequency equal to the sampling frequency of the audio signal. Thus, if the both operations are performed at this pace, there comes a moment at which the data writing operation exceeds the data reading operation.

In order to cope with this phenomenon, the audio buffer controller 10 stops the writing operation of the EFM demodulated data to the CD-ROM data storage 7 just before the data writing operation exceeds the reading operation, although the data reading operation therefrom still continues, and simultaneously the controller 10 informs the system controller 13 of the fact that the CD-ROM data storage 7 is overflown.

The system controller 13 sends a jump back signal to the track jump control circuit 12 on receiving this information, and moves the optical pick up device (not shown) for a predetermined pitch corresponding to a certain number of tracks. The number of tracks to be jumped back here is, for example, more than one, but not less than the number corresponding to the time required for reading out all the addresses in the CD-ROM data storage 7 at the frequency equal to the sampling frequency. If a 128 k-byte RAM is used as described in the figure, the optical pick up device will have to be jumped back for one track only.

When the data reading operation advances and takes all the written addresses to catch up with the point where the writing operation had been stopped, the audio buffer controller 10 detects it and resumes the writing operation starting from the data block following the data which had already been written. By this operation, it is made possible to read in the audio data from the disk at the quadrupled speed and simultaneously reproduce the thus read data at the normal speed.

Referring to FIG. 1, the operation of the device in case audio data is read out at the normal reading speed is now explained as below. It should be noted that the disk here is rotated at the normal speed. Further, the selectors 9 and 11 respectively select the A terminal sides, whereby the CD-ROM data storage 7 is disconnected from the audio signal processing section 1.

With the above situation, when the EFM demodulated data read out at the above speed is input, it is directly sent to the audio signal processing section 1 through terminal A of the selector 9, and after the conventional audio reproduction is through, the input data is further sent to the low pass filter 5 to be output as an audio reproduced signal.

Next, also referring to FIG. 1, the operation of the device in case digital data is read out from a disk at a high speed or normal speed is now explained as follows. It should be noted that the selectors 9 and 11 are both set to the A terminal side, and by this operation, the CD-ROM data storage 7 is connected to the CD-ROM data processing section 6 so as to work as its CD-ROM data storage, which is the original function thereof.

In this situation above, when the EFM demodulated data is input, the input data is first sent to the audio signal processing section 1 through terminal A of the selector 9, and after once stored in the audio signal memory 2 as conventionally done, an audio signal error correction is performed using the CIRC method at the audio signal processing section 1. Then, after being checked and corrected by the CIRC method, the data is sent to the CD-ROM data processing section 6, and thereafter it is further sent to the CD-ROM data storage 7 through terminal A of the reflector 11 to be stored therein. The stored data is then checked with a view to correcting error in CD-rom data if any by using error checking codes P and Q at the CD-ROM data processing section 6, and then after being sent to the host computer interface 8, the corrected data is further sent to the host computer.

Figure 2:
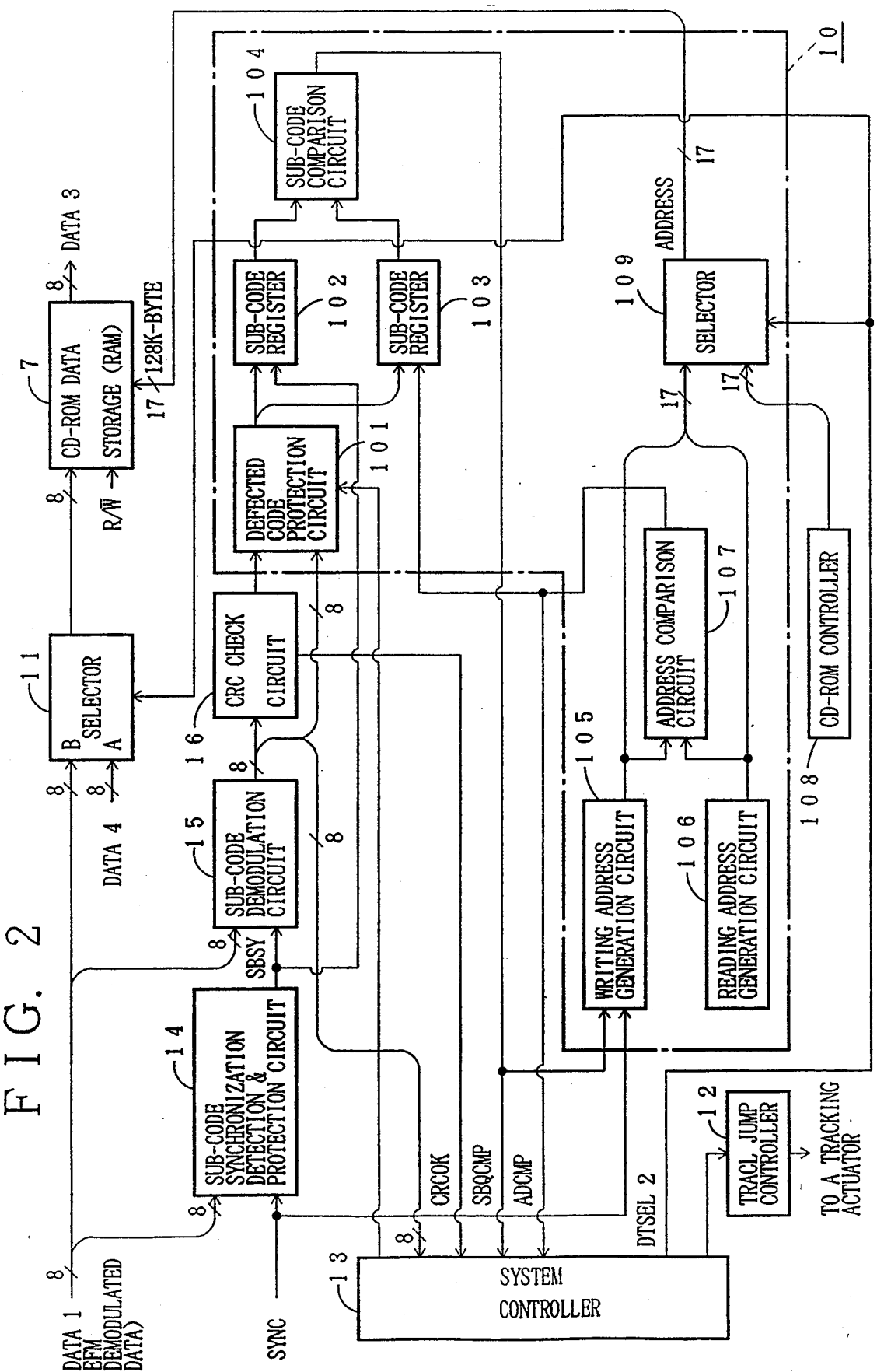
FIG. 2 is a diagram showing a concrete circuitry including an audio buffer controller and CD-ROM data storage of FIG. 1.
Figure 3:
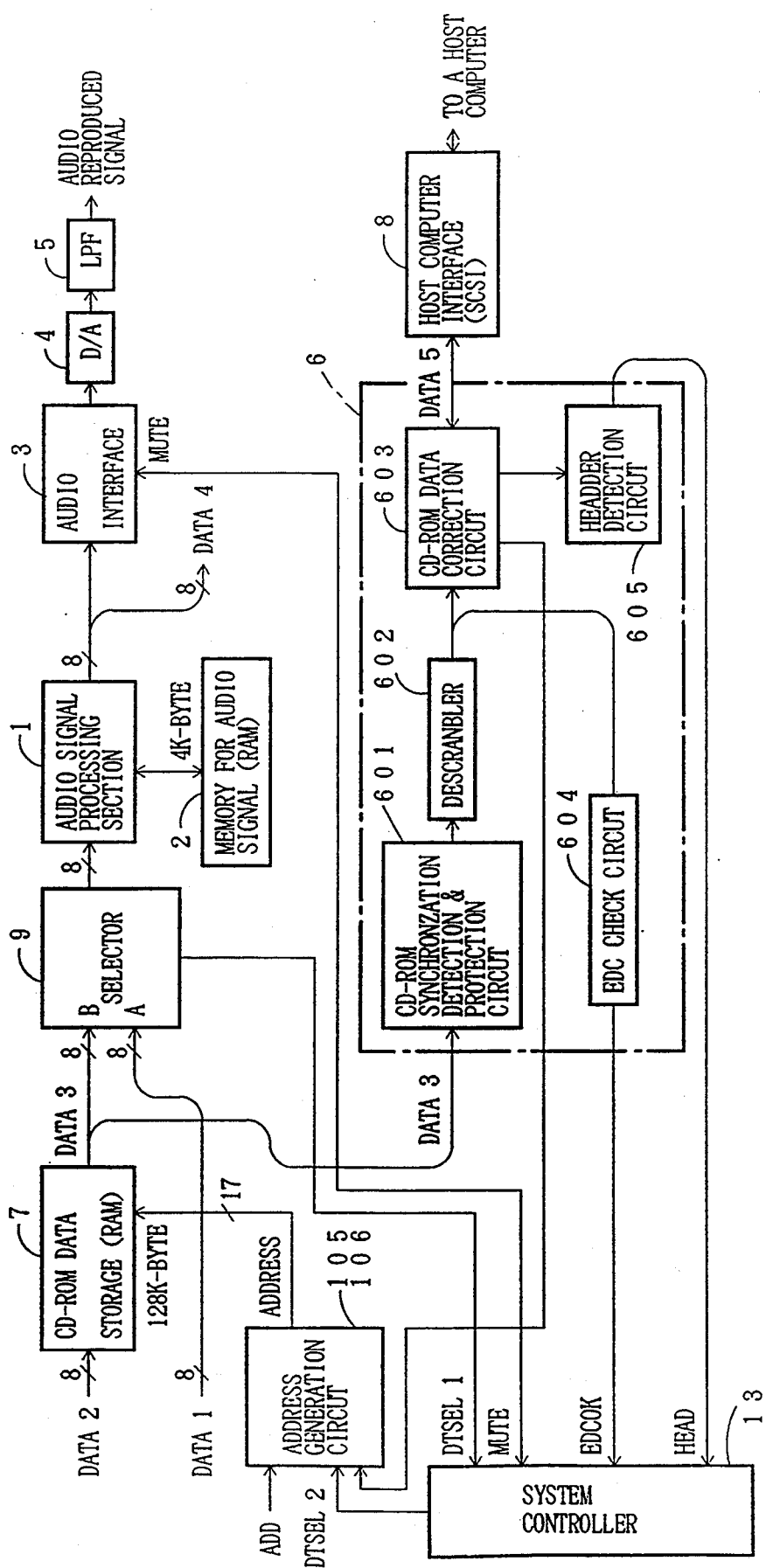
FIG. 3 is a diagram representing a concrete circuitry including an audio signal processing section and CD-ROM data processing section of FIG. 1.

FIGS. 2 and 3 respectively show concrete block circuits of this embodiment, wherein FIG. 2 is a concrete circuitry including an audio buffer controller 10 and CD-ROM data storage 7 of FIG. 1, whereas FIG. 3 is a diagram representing a concrete circuitry including an audio signal processing section 1 and CD-ROM data processing section 6 of FIG. 1. It is to be noted that like reference numerals in FIGS. 2 and 3 denote like or corresponding portions in FIG. 1.

In the following, operations of these circuitries disclosed in these figures are explained individually with respect to each case.

[1] In case of a reproduction of high-speed audio data

Referring to FIG. 2, the EFM demodulated data DATA1 input, for example at the quadruple speed, is fed to the CD-ROM data storage 7 by way of the selector 11, and simultaneously it is fed to a sub-code synchronization detection & protection circuit 14 and also to a sub-code demodulation circuit 15. The EFM demodulated data input to the CD-ROM data storage 7 is stored in the address in accordance with the writing address information sent from a writing address generation circuit 105 at the timing of four-time faster by way of a selector 109, and simultaneously the thus stored data is read out from the address specified by the reading address generation circuit 106 at the timing of the normal speed also by way of the selector 109 so as to output a signal DATA3.

On the other hand, the sub-code synchronization detection & protection circuit 14 detects a sub-code synchronization signal SBSY, and sends it to the sub-code demodulation circuit 15. The sub-code demodulation circuit 15 demodulates the sub code in the EFM demodulated data using this sub-code synchronization signal SBSY, then sends is to a CRC check circuit 16, a system controller 13, and to a defected code protection circuit 101.

The CRC check circuit 16 checks an error in each demodulated sub code, and in case there is an error such as defection of codes therein, the error-checked sub code is restored by the defected code protection circuit 101, and stored into sub-code registers 102 and 103. The sub-code register 102 is a register for storing the sub codes of the EFM demodulated data being currently received from the disk, and the sub-code register 103 is the one for storing the sub code of the data just before the CD-ROM data storage 7 is overflown and data writing operation to the storage 7 is prohibited.

The address comparison circuit 107 compares the writing address output from the writing address generation circuit 105 and the reading address output from the reading address generation circuit 106 in order to detect whether or not they coincide with each other. When these reading and writing addresses coincide, it is indicated that the capacity of the CD-ROM data storage 7 is full up, and that if more EFM data is written, the new EFM data is written on the previously written EFM demodulated data which has not been read out yet, so that the previously written data is destroyed.

Therefore, when the writing address and reading address coincide with each other, the address comparison circuit 107 generates an address coincidence signal ADCMP, and sends it to the sub-code register 103 and the system controller 13. When the sub-code register 103 receives this ADCMP signal, it stores the sub code of the data block just before the CD-ROM data storage 7 is overflown and the data writing operation thereto is prohibited.

When the system controller 13 receives the above ADCMP signal, it stops the address incremental operation of the writing address generation circuit 105 and simultaneously stops the writing operation into the CD-ROM data storage 7. Thus, thereafter, only a reading operation of the EFM demodulated data is permitted, and accordingly, the number of addresses available for writing EFM demodulated data is incremented in the CD-ROM data storage 7 afterwards.

Furthermore, the system controller 13 sends a jump back signal to the track jump-back control circuit 12 to jump back the optical pick up device for one track, and then repeats the reading operation at the four time faster speed therefrom. It is to be noted that the data read in by this operation are not stored in the CD-ROM data storage 7, but the sub-codes thereof only are stored sequentially into the sub-code register 102.

The sub-code comparison circuit 104 compares the EFM demodulated data currently being read out sequentially stored in the sub-code register 102 with the sub code of the data block stored just before the stoppage of the writing operation stored in the sub-code register 103 so as to check whether or not these data coincide with each other. When the current sub code stored in the sub-code register 102 and the sub code stored in the sub-code register 103 coincide with each other, it is indicated that the data reading position of the optical pick up device has reached to the position where the data writing operation had previously been stopped. When the sub-code comparison circuit 104 detects that these sub-codes are the same, it sends a sub-code coincidence signal SBQCMP to the system controller 13 and to the writing address generation circuit 105 simultaneously.

When the system controller 13 receives the above SBQCMP signal, it sets a write enable condition again to the CD-ROM data storage 7. Further, the writing address generation circuit 105 resumes the address incremental operation which had been stopped previously. As a result, the EFM demodulated data is started to be written into the CD-ROM data storage 7 at the quadrupled speed from the address just after the address where the writing operation had been stopped previously.

Thereafter, when the writing operation of the EFM demodulated data catches up with the reading operation, and the writing address coincide with the reading address, then the writing operation is again stopped, so that the same process is repeated. This way, it is enabled that while EFM demodulated audio data are sequentially written into the CD-ROM data storage 7 one after the other at the four-time faster speed, they are simultaneously sent to the audio signal processing section 1 at the normal speed.

By the way, in the above process, when the sub-code coincidence signal SBQCMP is not output from the sub-code comparison circuit 104 within a predetermined time, the system controller 13 calculates and obtains a sub code which is in the block more than one track before the sub code of the moment when the address coincidence signal ADCMP was output, and backs up the track jump control circuit 12, so that the audio data which has not been read out is started to be read out from the thus obtained sub code.

The EFM demodulated data stored into the CD-ROM data storage 7 at the four-time faster speed and simultaneously read out therefrom at the normal speed is sent to the audio signal processing section 1 by way of the selector 9 shown in FIG. 3, and then stored in the audio signal memory 2. Thereafter when the CIRC error check is completed, the data is sent to the D/A converter 4 by way of an audio interface 3, and after the high-frequency component is signal is taken away from the low pass filter 5, a reproduced audio signal is finally output in the form of analog signal.

[2] In case of a conventional reproduction of audio data

The EFM demodulated data DATA1 is sent to the audio signal processing section 1 by way of the selector 9, and then stored in the audio signal memory 2. Thereafter when the CIRC error check is completed, the data is sent to the D/A converter 4 by way of the audio interface 3 and then after the high-frequency component is taken away at the low pass filter 5, an analog-formed audio signal is finally output.

It is to be noted that in the case above, the reading speed of the audio signal coincides with the rotational speed of the spindle motor that rotates the disk. Thereafter, when the spindle motor is rotated at the normal speed, the sound of the original speed is reproduced, and when it is rotated at four-time faster speed, the sound of quadrupled speed is reproduced.

[3] In case of a reproduction of high-speed or normal speed audio data

Regardless of normal or quadrupled speed, a reading of digital data from the disk is performed such that the EFM demodulated data DATA1 is sent to the audio signal processing section 1 by way of the selector 9 shown in FIG. 3, and then stored in the audio signal memory 2, and thereafter, it is checked by the CIRC method as disclosed above. When the CIRC check is completed, the signal DATA4 is transmitted to the CD-ROM data storage 7 by way of the selector 11 shown in FIG. 2. In short, when the digital data is read in and processed to be reproduced, the CD-ROM data storage 7 is used as a CD-ROM data buffer, which is the original use thereof.

The data stored in the CD-ROM data storage 7 is sent to the CD-ROM data processing section 6 as shown in FIG. 3, wherein a detection of CD-ROM synchronization, descrambling, data correction of the CD-ROM, EDC check, detection of header are performed respectively at the CD-ROM synchronization detection & protection circuit 601, descrambler 602, CD-ROM data correction circuit 603, EDC check circuit 604, and at the header detection circuit 605.

Then, the digital data signal DATA5 which is fed after the CD-ROM data correction is completed, is transmitted to a host-computer through the host computer interface 8 such as SCSI. At this stage, when the digital data is being read in at the normal speed, each data is sent at the normal speed (150K-bytes/s), and when read in at the quadrupled speed, each data is sent at the quadrupled speed (600K-bytes/s). It should be noted that during the above reading operation of the digital data, the system controller 13 sends a mute signal MUTE=0 to the audio interface 3 so as to set the output at the audio data reproducing side to o.

As described above, the data processing regarding the audio data and that regarding digital data are explained individually. However, whether the data being read in is audio data or digital data can be easily identified by the sub code in the EFM demodulated data. Therefore, even when the audio and digital data are mixedly recorded in one disk, the audio data and digital data are selectively processed at a high speed from the disk by turns by switching either to the audio reproduction mode or to the digital reproduction mode in real time.

As is obvious from the explanation above, by the present invention, even in the case of reading in digital data and audio data from one disk by turns, it is not necessary to slow down the rotational speed of the disk to reproduce the audio data.

While the invention has been described with reference to specific embodiments, the description is illustrative and is not to be construed as limiting the scope of the invention.

What is claimed is:

1. A method of reproducing audio data recorded together with digital data in an optical disk for a CD-ROM player, wherein said CD-ROM player comprises an optical pick up device, a signal processing unit including an audio signal processing section and a CD-ROM data storage, said method comprising the steps of:
   receiving EFM demodulated data sent at a high speed one after the other into the signal processing unit;
   writing said received data into the CD-ROM data storage as an input buffer for the audio signal processing section;
   reading out simultaneously said written data from the CD-ROM data storage at a predetermined reproducing speed to transmit to the audio signal processing section;
   prohibiting the data writing operation while continuing a data reading operation to make empty addresses when all the addresses in the CD-ROM data storage are filled with the EFM data, and the writing operation turns around to reach the address which has not been read out yet;
   jumping the optical pick up device back for a certain pitch corresponding to a predetermined number of tracks of the optical disk to read in EFM data; and
   resuming the data writing operation into the CD-ROM data storage starting from the data which was not written due to the previous prohibition thereof when a predetermined number of vacant addresses is made in the CD-ROM data storage by the continued data reading operation which has been advanced during the period the data writing operation was stopped.

2. A method of reproducing audio data as claimed in claim 1, wherein said data writing operation into the CD-ROM data storage and prohibiting operation thereof are performed per data-block unit of a CD format.

3. A method of reproducing audio data as claimed in claim 2, wherein said method further comprises the steps of:
   recording a sub code of the EFM data just before said data write prohibiting operation into the CD-ROM data storage; and
   storing only the sub codes of each data block from the point in the optical disk where the pick up device was previously jumped back until the sub code recorded before said write prohibiting operation and that stored thereafter become the same.

4. A method of reproducing audio data in accordance with claim 1, wherein said predetermined reproducing speed is equal to the sampling frequency of the audio data.

5. A method of reproducing digital data recorded on an optical disk comprising the steps of:
   receiving first digital data from said optical disk faster than a predetermined reproducing speed;
   processing said first digital data in a first signal processing unit at a speed faster than said predetermined reproducing speed;
   providing a buffer memory for temporarily storing said received first digital data when said first signal processor is unable to accept said first digital data;
   receiving second digital data, which is recorded together with said first digital data on said optical disk, said second digital data being sequentially sent from said optical disk at a speed which is faster than said predetermined reproducing speed;
   writing said received second digital data into said buffer memory as an input buffer;
   reading out said written second digital data from said buffer memory at said predetermined reproducing speed and transmitting to a second digital signal processing unit; and
   reproducing said first digital signal at a speed which is faster than said predetermined reproducing speed and reproducing said second digital signal at a speed which corresponds to said predetermined reproducing speed.

6. A method of reproducing digital data in accordance with claim 5, further comprising the steps of:
   temporarily prohibiting said writing step while reading out said second digital data if said buffer memory has been substantially filled with said second digital data, thereby partially emptying said buffer memory;
   re-reading said second digital data; and
   resuming said writing step, after a predetermined amount of said buffer memory has been emptied by the continued data reading operation, so as to write said second data into said memory buffer, starting from the data which was not written due to the previous prohibition thereof.

* * * * *